United States Patent
Hertlein et al.

(10) Patent No.: US 11,941,888 B2
(45) Date of Patent: Mar. 26, 2024

(54) METHOD AND DEVICE FOR GENERATING TRAINING DATA FOR A RECOGNITION MODEL FOR RECOGNIZING OBJECTS IN SENSOR DATA OF A SENSOR, IN PARTICULAR, OF A VEHICLE, METHOD FOR TRAINING AND METHOD FOR ACTIVATING

(71) Applicant: Robert Bosch GmbH, Stuttgart (DE)

(72) Inventors: Heinz Hertlein, Erlenbach (DE); Joscha Liedtke, Ludwigsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 493 days.

(21) Appl. No.: 17/063,572

(22) Filed: Oct. 5, 2020

(65) Prior Publication Data
US 2021/0117696 A1    Apr. 22, 2021

(30) Foreign Application Priority Data
Oct. 16, 2019    (DE) .......................... 102019215903.6

(51) Int. Cl.
| | |
|---|---|
| G06V 20/56 | (2022.01) |
| G06F 18/214 | (2023.01) |
| G06F 18/25 | (2023.01) |
| G06N 3/08 | (2023.01) |
| G06N 20/00 | (2019.01) |
| G06V 10/764 | (2022.01) |
| G06V 10/774 | (2022.01) |
| G06V 10/80 | (2022.01) |
| G06V 20/64 | (2022.01) |

(52) U.S. Cl.
CPC ............ *G06V 20/56* (2022.01); *G06F 18/214* (2023.01); *G06F 18/251* (2023.01); *G06N 3/08* (2013.01); *G06N 20/00* (2019.01); *G06V 10/764* (2022.01); *G06V 10/774* (2022.01); *G06V 10/80* (2022.01); *G06V 20/653* (2022.01)

(58) Field of Classification Search
None
See application file for complete search history.

(56) References Cited

U.S. PATENT DOCUMENTS

2017/0320437 A1 * 11/2017 Liebau .................. G01C 11/06
2018/0349785 A1 * 12/2018 Zheng .................. G05D 1/0088
(Continued)

OTHER PUBLICATIONS

Piewak, Florian, et al. "Boosting lidar-based semantic labeling by cross-modal training data generation." Proceedings of the European Conference on Computer Vision (ECCV) Workshops. 2018. (Year: 2018).*

(Continued)

*Primary Examiner* — Sean M Conner
(74) *Attorney, Agent, or Firm* — NORTON ROSE FULBRIGHT US LLP; Gerard A. Messina

(57) ABSTRACT

A method for generating training data for a recognition model for recognizing objects in sensor data of a sensor. Objects and object attributes are recognized in auxiliary sensor data of an auxiliary sensor mapping at least one overlapping area using a trained auxiliary recognition model, and the object attributes of the objects recognized in the overlapping area being transferred to the sensor data mapping at least the overlapping area in order to generate training data.

13 Claims, 4 Drawing Sheets

(56) References Cited

U.S. PATENT DOCUMENTS

| | | | |
|---|---|---|---|
| 2019/0286915 A1* | 9/2019 | Patil | G05D 1/0246 |
| 2021/0063578 A1* | 3/2021 | Wekel | G01S 7/481 |
| 2021/0073584 A1* | 3/2021 | St. Romain, II | G06F 18/2148 |

OTHER PUBLICATIONS

Chipengo, Ushemadzoro, Peter M. Krenz, and Shawn Carpenter. "From antenna design to high fidelity, full physics automotive radar sensor corner case simulation." Modelling and Simulation in Engineering 2018 (2018). (Year: 2018).*

Cordts, Marius, et al. "The cityscapes dataset for semantic urban scene understanding." Proceedings of the IEEE conference on computer vision and pattern recognition. 2016. (Year: 2016).*

Boers, R., et al. "Ground-based observations and modeling of the visibility and radar reflectivity in a radiation fog layer." Journal of Atmospheric and Oceanic Technology 30.2 (2013): 288-300. (Year: 2013).*

* cited by examiner

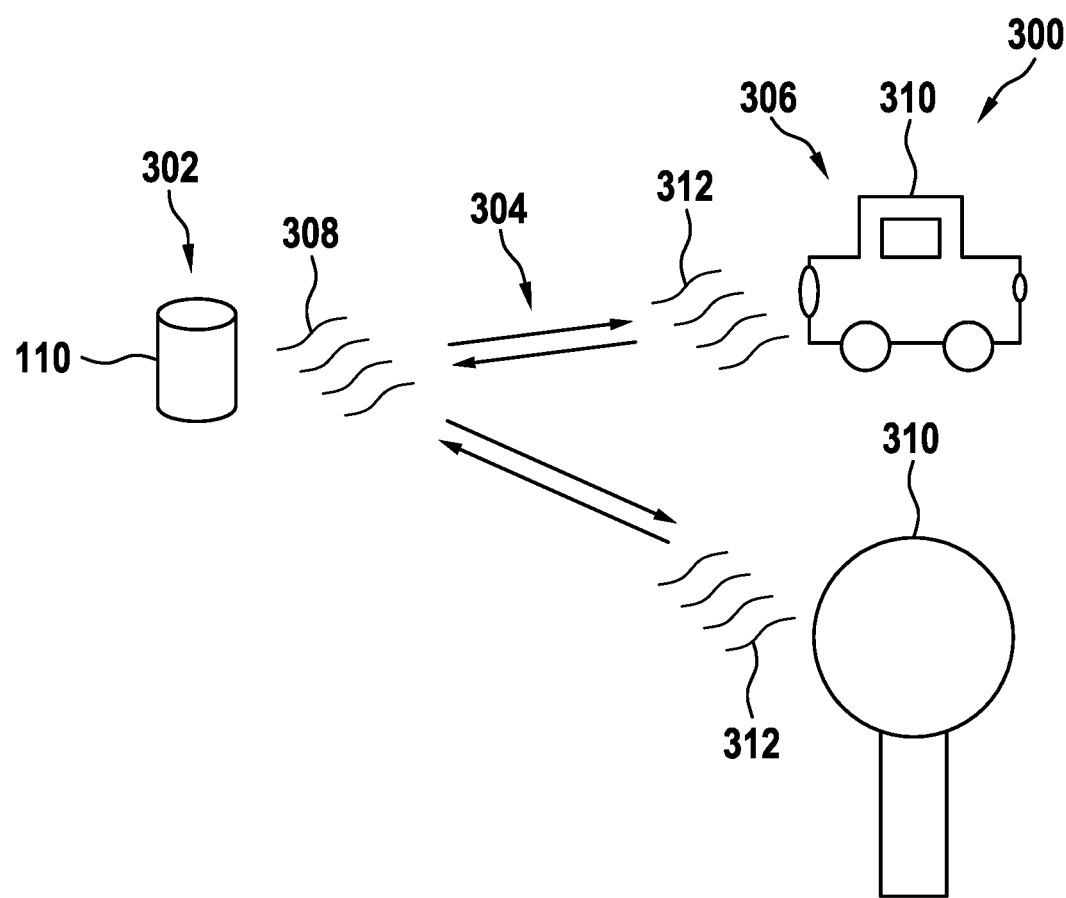

METHOD AND DEVICE FOR GENERATING TRAINING DATA FOR A RECOGNITION MODEL FOR RECOGNIZING OBJECTS IN SENSOR DATA OF A SENSOR, IN PARTICULAR, OF A VEHICLE, METHOD FOR TRAINING AND METHOD FOR ACTIVATING

CROSS REFERENCE

The present application claims the benefit under 35 U.S.C. § 119 of German Patent Application No. DE 102019215903.6 filed on Oct. 16, 2019, which is expressly incorporated herein by reference in its entirety.

FIELD

The present invention relates to a method and a device for generating training data for a recognition model for recognizing objects in sensor data of a sensor, in particular, of a vehicle, to a method for training a recognition model and to a method for activating an autonomous robot.

BACKGROUND INFORMATION

A recognition model for automatically recognizing objects in sensor data may be trained using training data. The training data may be generated manually by recorded sensor data being examined by humans and objects being searched for in the sensor data. An object found may then be assigned a label. The label may contain pieces of information about the object. The pieces of information may be referred to as object attributes. The training data may be referred to as a labeled sample.

SUMMARY

In accordance with example embodiments of the present invention, a method for generating training data for a recognition model for recognizing objects in sensor data of a sensor and a corresponding device, a method for training a recognition model and a method for activating an autonomous robot, and finally a corresponding computer program product and a machine-readable memory medium are provided. Advantageous refinements of and improvements on the approach presented herein result from the description herein and the figures.

Specific embodiments of the present invention may advantageously make it possible to automatically generate training data for training a recognition model. The automatic generation enables a large volume of training data to be generated, as a result of which the training of the recognition model may be improved. A manual effort may also be reduced. A uniform quality of the training data may be achieved since the same recognition criteria are always used and inconsistencies are able to be avoided as a result of the automatic generation.

A method is provided for generating training data for a recognition model for recognizing objects in sensor data of a sensor, objects and object attributes being recognized in auxiliary sensor data of an auxiliary sensor mapping at least one overlapping area using a trained auxiliary recognition model, and the object attributes of the objects recognized in the overlapping area being transferred to the sensor data mapping at least the overlapping area in order to generate training data.

Ideas relating to specific embodiments of the present invention may be considered to be based on, among other things, the features and findings described below.

A recognition model may be referred to as an algorithm for pattern recognition. The recognition model may be trained to recognize objects in sensor data using training data and to assign them object attributes. The training data may be referred to as a labeled sample. Training data may be based on recorded sensor data of a sensor. In order to render sensor data into training data, objects mapped in the sensor data may be marked as objects. The marked objects may be assigned object attributes. The object attributes may be referred to as labels. In accordance with example embodiments of the present invention, the objects and object attributes in other sensor data are automatically recognized by a previously trained recognition model. The object attributes are transferred to the recorded sensor data. The other sensor data are detected by an additional auxiliary sensor and are referred to as auxiliary sensor data.

Accordingly, the previously trained recognition model is referred to as an auxiliary recognition model. The object attributes may also be transferred from the auxiliary sensor data to further sensor data of further sensors in order to obtain further training data.

The sensor and the auxiliary sensor may have a shared operating principle. The sensor and the auxiliary sensor may, in particular, have different operating principles, however. The operating principle may be referred to as a mode or a modality. In the case of different operating principles, the sensor and the auxiliary sensor may be referred to as multimodal sensors. The sensor and the auxiliary sensor are able to detect real objects in real surroundings. In an overlapping area, the objects are able to be detected essentially simultaneously by the sensor and the auxiliary sensor. Both the sensor as well as the auxiliary sensor may be designed as a sensor system and are able to fuse data from multiple identical sensor units. The sensor and the auxiliary sensor may be mechanically coupled to one another. For example, the sensor and the auxiliary sensor may be situated at the same robot. The robot may be designed as an autonomous robot. The robot may be a vehicle, in particular, an autonomous or semi-autonomous vehicle. The auxiliary sensor may be situated temporarily at the robot and be oriented to the overlapping area.

To transfer the object attributes, data points of the sensor data may be assigned the object attributes of corresponding auxiliary data points of the auxiliary sensor data within a location tolerance. A data point may, for example, be a pixel and may include an image coordinate value and an intensity value. The data point may also be a point in space and may include a direction value and a distance value. Multiple data points within an area may represent a shared object. The trained recognition model is able to recognize the affiliation of the data points to the same object.

The objects and object attributes may be synchronized using the sensor data. The auxiliary sensor data and the sensor data may be detected using different scanning frequencies. Due to the different scanning frequencies, different detection points in time at the sensor and auxiliary sensor may result. With a relative movement of an object between the detection points in time, it is possible to detect the object at different positions in the overlapping area. During synchronization, the recording point in time of the two sensors may be synchronized. The synchronization then takes place before the recording. The objects and object attributes are then also synchronized, since they correspond to the auxiliary sensor recording point in time.

To synchronize, a sensor movement of the sensor between an auxiliary detection point in time of an object by the auxiliary sensor and a detection point in time of the object by the sensor may be compensated for using a piece of sensor movement information. A piece of sensor movement information may, for example, be provided by a control unit of the robot. The piece of sensor movement information may also be provided by a movement sensor, such as an inertial sensor system.

To synchronize, an object movement of an object between an auxiliary detection point in time of the object by the auxiliary sensor and a detection point in time of the object by the sensor may alternatively or in addition be compensated for using an object movement attribute. A trajectory of the object may be ascertained based on at least two temporally offset detection points in time and/or auxiliary detection points in time. The object movement up to the detection point in time or the auxiliary detection point in time may be interpolated.

The sensor data and the auxiliary sensor data may be detected by a shared sensor platform. The sensor and the auxiliary sensor may be mechanically coupled to one another. In this way, the sensor and the auxiliary sensor may be moved essentially synchronously. Due to the shared sensor platform, the sensor and the auxiliary sensor may have an essentially identical view angle on the overlapping area. In this way, the object attributes may be easily transferred.

The sensor data may be read in from a sensor of a first modality. The auxiliary sensor data may be read in from an auxiliary sensor of a second modality. The sensor and the auxiliary sensor may have different operating principles. For example, the sensor may be a radar sensor. The auxiliary sensor may, for example, be a LIDAR sensor. The auxiliary recognition model for the auxiliary sensor may be easily trained.

The auxiliary recognition model may be trained using simulation training data before recognizing the object attributes. Simulation training data may be artificially generated training data. The simulation training data may map typical situations and objects. Defined boundary conditions in the simulation training data may be selected.

The simulation training data may be generated using a generation model. The generation model may encompass a sensor model of the auxiliary sensor, a propagation model and an object model of at least one virtual object. The sensor model may be used to simulate a wave emission of the auxiliary sensor. The propagation model may be used to simulate a transmission of the wave emission through virtual surroundings to the object as incoming waves. The object model may be used to simulate a reflection of the transmitted wave emission at the object. The propagation model may be used to simulate the transmission of the reflection through the virtual surroundings to the auxiliary sensor as incoming waves. The sensor model may be used to simulate the detection of the transmitted reflection by the auxiliary sensor. The detected reflection may be assigned at least one object attribute of the virtual object provided by the object model in order to generate the simulation training data. A generation model may be a highly realistic map of reality.

Situations may be generated in the generation model, which in reality may occur only randomly. As a result, it is possible to also generate simulation training data for difficult situations. A recognition quality of the auxiliary recognition model may be enhanced in this way.

The method may, for example, be implemented in software or hardware or in a mixed form of software and hardware, for example, in a control unit.

The present invention further provides a device, which is designed to carry out, activate or implement the steps of a variant of a method presented herein in corresponding units.

The example device may be an electrical device including at least one processing unit for processing signals or data, at least one memory unit for storing signals or data, and at least one interface and/or one communication interface for reading in or outputting data, which are embedded in a communication protocol. The processing unit may, for example, be a signal processor, a so-called system ASIC or a microcontroller for processing sensor signals and for outputting data signals as a function of the sensor signals. The memory unit may, for example, be a flash memory, an EPROM or a magnetic memory unit. The interface may be designed as a sensor interface for reading in the sensor signals from a sensor and/or as an actuator interface for outputting the data signals and/or control signals to an actuator. The communication interface may be designed to read in or output data wirelessly and/or in a hardwired manner. The interfaces may also be software modules, which are present, for example, on a microcontroller along with other software modules.

Also advantageous is a computer program product or computer program having program code, which may be stored on a machine-readable medium or memory medium, such as a semiconductor memory, a hard disk memory or an optical memory, and which is used for carrying out, implementing and/or controlling the steps of the method according to one of the above-described specific embodiments, in particular, when the program product or program is executed on a computer or a device.

In accordance with an example embodiment of the present invention, a method for training a recognition model is also provided, the training of the recognition model taking place based on training data, which are generated with the aid of one of the above-described methods.

In accordance with an example embodiment of the present invention, a method is also provided for activating an autonomous robot, in particular, an at least semi-automated vehicle, the robot being activated based on data generated with the aid of a recognition model trained in such a way.

During the activation, the longitudinal dynamic and/or transverse dynamic of the robot may be adapted. Based on a recognition of objects along the planned driving trajectory of a vehicle, for example, it is possible to initiate a lane change maneuver and/or an emergency stop of the vehicle.

It is noted that some of the possible features and advantages of the present invention are described herein with reference to different specific embodiments. Those skilled in the art recognize that the features of the device and of the method may be combined, adapted or exchanged in a suitable manner in order to arrive at further specific embodiments of the present invention.

BRIEF DESCRIPTION OF THE DRAWINGS

Specific embodiments of the present invention are described below with reference to the figures, neither the figure nor the description to be interpreted as restricting the present invention.

FIG. 3a shows a representation of a generation model for a method according to one exemplary embodiment of the present invention.

The figures are merely schematic and not true to scale. Identical reference numerals denote features in the figures that are identical or act identically.

DETAILED DESCRIPTION OF EXAMPLE EMBODIMENTS

Figure 1:
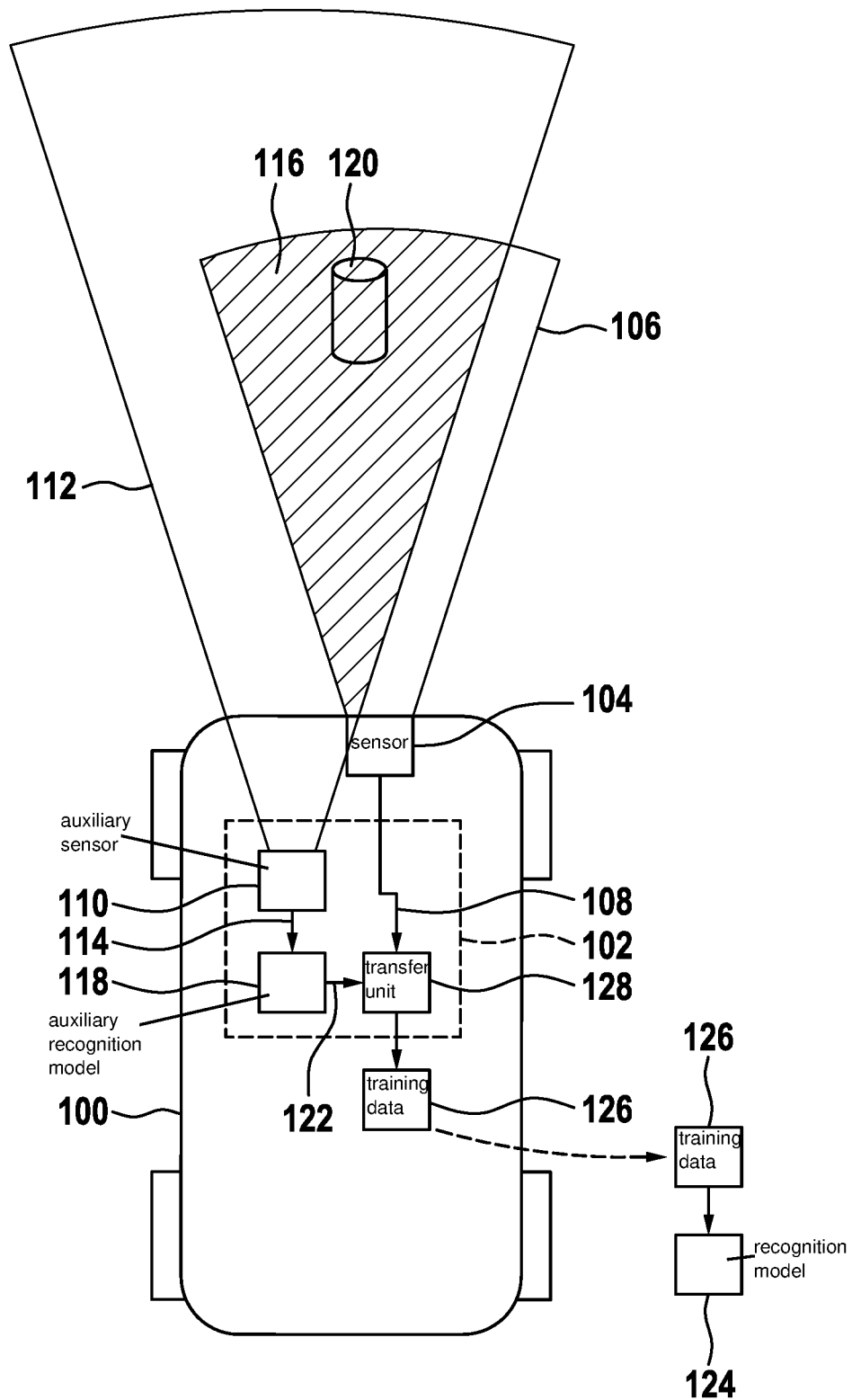
FIG. 1 shows a representation of a vehicle including a device according to one exemplary embodiment of the present invention.

FIG. 1 shows a representation of a vehicle 100 including a device 102 according to one exemplary embodiment. Vehicle 100 may, for example, be an autonomous or semi-autonomous motor vehicle. Vehicle 100 includes a sensor 104, which detects and maps in sensor data 108 a detection area 106 ahead of the vehicle. Vehicle 100 further includes an additional auxiliary sensor 110. Auxiliary sensor 110 also detects an auxiliary detection area 112 ahead of vehicle 100 and maps auxiliary detection area 112 in auxiliary sensor data 114. Detection area 106 and auxiliary detection area 112 overlap in an overlapping area 116. Auxiliary sensor 110 may be temporarily situated at vehicle 100. Auxiliary sensor 110 may also be a component of a sensor system of vehicle 100.

A previously trained auxiliary recognition model 118 for auxiliary sensor 110 recognizes objects 120 mapped in auxiliary sensor data 114 in auxiliary detection area 112 and assigns object attributes 122 to objects 120. Auxiliary recognition model 118 in this case includes an algorithm that has been trained via a training to recognize objects 120 in auxiliary sensor data 114. The training in this case has taken place using labeled samples. Areas including recognizable objects are marked in the labeled samples and the corresponding object attributes of the objects are also stored. The auxiliary recognition model has learned to recognize objects 120 based on the labeled samples.

Sensor 104 is assigned a recognition model 124 for recognizing objects 120 in sensor data 108 of sensor 104. Device 100 is designed to generate training data 126 for recognition model 124. Training data 126 may be referred to as a labeled sample. Once training data 126 have been collected, they may be used for training recognition model 124. For this purpose, multiple entities of device 100 may also be used in such a way that initially multiple variants of training data 126 are generated, which are then assembled to form a larger labeled sample of training data 126. Device 102 also includes a transfer unit 128. Transfer unit 128 transfers object attributes 122 or labels of objects 120 recognized in overlapping area 116 using auxiliary recognition model 118 to sensor data 126 in order to generate training data 126 for recognition model 124. The training data or labeled sample 126 may also be used for purposes other than the training of recognition model 124, for example, for evaluating or optimizing or tuning a recognition model for sensor data 108 not-trained or trained using other means.

Sensor 104 may, for example, be a radar sensor, whereas auxiliary sensor 110 may be a LIDAR sensor. Sensor 104 and auxiliary sensor 110 may therefore have different operating principles.

A sample is typically initially recorded with a vehicle or a fleet of vehicles. The training then takes place outside the vehicle, for example, on servers. The recognition using auxiliary recognition model 118 and the transfer or interpolation of the label with the aid of transfer unit 128 to sample 126 may take place "afterwards" outside of the vehicle.

The training of recognition model 124 is an important, but not the only, application for the automatically generated labeled sample.

Figure 2:
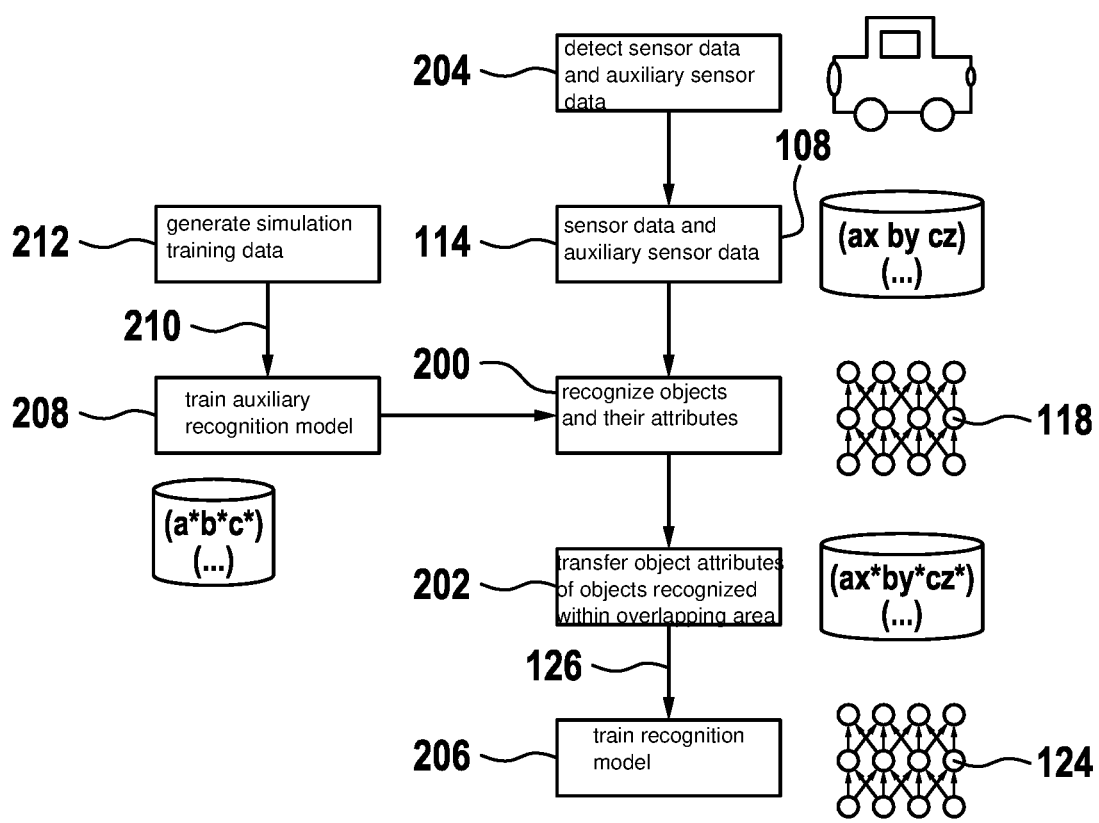
FIG. 2 shows a flowchart of a method according to one exemplary embodiment of the present invention.

FIG. 2 shows a flowchart of a method according to one exemplary embodiment of the present invention. The method may, for example, be carried out on a device as in FIG. 1. The method includes a step 200 of recognizing and a step 202 of transferring. In step 200 of recognizing, objects 120 and their attributes 122 are recognized in auxiliary sensor data 114 of an auxiliary sensor using an auxiliary recognition model 118. In step 202 of transferring, object attributes 122 of the objects recognized within an overlapping area are transferred in an automated manner to sensor data 108 of a sensor in order to generate training data 126 for a recognition model 124 of the sensor.

In step 202 of transferring, coordinates of data points of auxiliary sensor data 114, at which objects 120 recognized by auxiliary recognition model 118 are recognized, are used in the process to assign data points of sensor data 108 having essentially the same coordinates as object attributes 122 of recognized objects 120. In other words, an essentially identical area of sensor data 108, in which an object 120 is recognized in auxiliary sensor data 114, is assigned object attributes 122 of recognized object 120.

In one exemplary embodiment, auxiliary sensor data 114 are synchronized with sensor data 108 in order to reduce offsets at the various sensors during relative movements between the objects and the sensors due to different detection points in time.

Sensor data 108 and auxiliary sensor data 114 are detected in a preceding step 204 of detecting using the sensor and the auxiliary sensor. In a subsequent step 206 of training, recognition model 124 is trained using training data 126.

In one exemplary embodiment, auxiliary recognition model 118 is trained beforehand in an additional step 208 of training using simulation training data 210. Simulation training data 210 may be synthetically generated using a generation model in a step 212 of generating.

FIG. 3a shows a representation of a generation model 300 for a method according to one exemplary embodiment. Generation model 300 may, for example, be used in a step of generating for generating auxiliary training data. Generation model 300 encompasses a sensor model 302, a propagation model 304 and an object model 306.

Sensor model 302 virtually maps auxiliary sensor 110. Propagation model 304 virtually maps a behavior of a wave emission 308 of sensor model 302. Object model 306 virtually maps at least one object 310 marked by its object attributes.

Wave emission 308 is simulated at auxiliary sensor 110 using sensor model 302. In this case, optical effects at optical elements or generally electromagnetic effects at elements influencing electromagnetic waves or, for example, in the case of ultrasonic sensors, acoustic effects at acoustic elements are simulated in a transmission path of auxiliary sensor 110. The optical or generally electromagnetic or acoustic effects are, for example, attenuations, refractions, scatterings and/or reflections.

A propagation of wave emission 308 through a virtual environment up to virtual object 310 is simulated using propagation model 304. In this case, optical effects at air components, such as particles and aerosols, for example, between auxiliary sensor 110 and virtual object 310, are simulated. The optical effects in this case are defined by a distance of object 310 from auxiliary sensor 110 as one of the object attributes.

A reflection 312 of incoming wave emissions 308 is simulated using object model 306. Virtual object 310 is defined by the predefined object attributes. The object attributes are, for example, a type of object 310, a color of object 310, a surface structure of object 310, an orientation of object 310 relative to auxiliary sensor 110 and/or a velocity of object 310 relative to auxiliary sensor 110. In this case, optical effects at the surface of object 310 are simulated, for example.

On the reverse path, the propagation of reflection 312 through virtual surroundings up to auxiliary sensor 110 is simulated using propagation model 304.

The reception of incoming reflection 312 by auxiliary sensor 110 is then simulated using sensor model 302. In this case, optical effects at optical elements in a reception path of auxiliary sensor 110 are simulated, for example. Generation model 300 thus outputs raw data, which correspond essentially to actually generated raw data. In addition, the object attributes of the at least one object 310 are contained in the auxiliary training data generated by generation model 300.

Figure 3B:
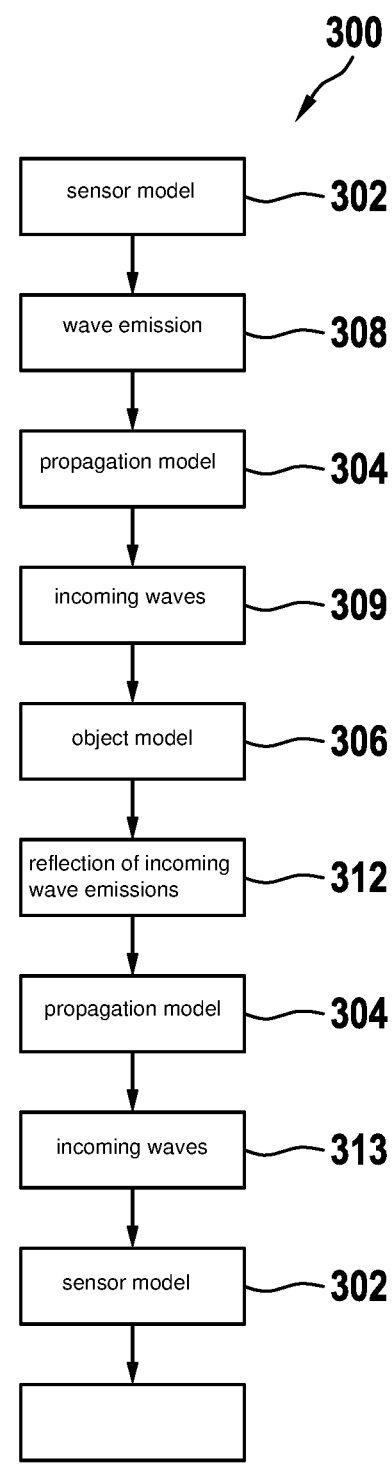
FIG. 3b shows a flowchart of a generation model for a method according to one exemplary embodiment of the present invention.

FIG. 3b shows a flowchart of a generation model for a method according to one exemplary embodiment. Generation model 300 corresponds in this case essentially to the generation model in FIG. 3a. Sensor model 302 calculates waves 308 emitted by the auxiliary sensor. Propagation model 304 calculates therefrom waves 309 arriving at the object. Object model 306 calculates waves 312 reflected by the object. Propagation model 304 calculates waves 313 arriving at the auxiliary sensor and sensor model 302 calculates the raw data output by the sensor, for example, as a point cloud.

FURTHER DETAILED DESCRIPTION OF THE PRESENT INVENTION

In other words, in accordance with an example embodiment of the present invention, a method is presented for training a recognition model of one sensor modality for an autonomous robot using synthetic data of another modality.

One important problem in the field of robotics is the surroundings perception or perception. This involves detecting the surroundings of an autonomously or semi-autonomously acting machine using sensors and to recognize them using methods of pattern recognition, i.e., to convert the sensor data into a symbolic description of relevant aspects of the surroundings. This symbolic description then forms the basis for the implementation of actions in the surroundings, which correspond to the application or to the intended purpose of the machine. The machine may, for example, be an autonomous or semi-autonomous vehicle or, more generally, an autonomously or semi-autonomously acting robot. A typical example of the symbolic description of the surroundings is to describe static and dynamic objects with the aid of attributes, which characterize, for example, the position, shape, size and/or velocity of the respective object. The objects may, for example, be obstacles, with which a collision is to be avoided.

This surroundings perception is frequently based on the data supplied by a single sensor or by a combination of multiple sensors. For example, the camera sensor, radar sensor, LIDAR sensor, and ultrasonic sensors are combined to form a multimodal sensor set.

The processing of these sensor data for generating the symbolic representation of the surroundings represents a complex problem of pattern recognition. The best recognition performance, i.e., the lowest error probability, is generally achieved using trained methods, in particular, using artificial "deep" neural networks, such as Deep Neural Networks/Deep Learning, the architecture of which includes a relatively large number of hidden layers.

To be able to train such methods and to achieve a good recognition performance requires a labeled sample of a particular size, which is made up of recorded sensor measurements and the associated labels, i.e., the symbolic description of objects detected by the sensor. In addition, labeled samples are required for safeguarding, evaluating and validating such surroundings recognition methods.

Previously, manual labeling methods were normally used, in which human processors generated the reference label of the surroundings based on image data of the surroundings of the ego vehicle and/or visualizations of the non-image-based sensor data. These manual methods are time-consuming and cost-intensive. Accordingly, the volume of labeled sensor data capable of being generated in this manner is limited. The manually labeled sensor data may furthermore exhibit inaccuracies due to errors of the human processors, as well as inconsistencies due to different implementations of the manual labeling by the different human processors.

With the example embodiments of the present invention presented herein, it is possible to improve upon the recognition performance of the trained methods.

For this purpose, the symbolic representations or the labels of the surroundings of the robot are generated automatically, i.e., with no human processors and with no manual labeling, with the aid of a method made up of two phases. A labeled sample of sensor data may thus be generated with the aid of an assignment of the labels to recorded sensor data.

The example method is based on the training in the first phase of a model for pattern recognition (hereinafter "recognition model of phase one") of sensor data of a first modality with the aid of training. After completion of the training, the recognition model of phase one allows the automatic generation of labels for symbolically describing the surroundings if sensor data of the first modality are present. The training data, i.e., the labeled sample of sensor data of the first modality, are synthetically generated in this case, i.e., represent the result of a simulation. Within the simulation, a model of the first modality is utilized in order to synthetically generate the sensor data of this modality from a simulated surroundings representation. This model is referred to as a "generation model." The first sensor modality may, for example, be LIDAR.

In the second phase of the method, real, i.e., non-simulated sensor data are recorded with the aid of a vehicle or robot equipped with sensors. In this case, a sensor of the first modality and a further sensor of a second, different modality are used. The field of view of the first modality in this case should be at least exactly the same size as the field of view of the second modality. Fields of view of multiple sensors of the same modality may be combined in this case. The recognition model of phase one is then used to process the sensor data of the first modality in order to generate the labels of the surroundings. Because the field of view of the second sensor is not larger than that of the first, it is possible to transfer these labels to the data of the second sensor. In this case, a temporal interpolation of the labels may be necessary.

By transferring these labels to the recorded data of sensor two, a labeled sample for the second modality is generated. This labeled sample is used for training a model for recognizing the sensor data of the second modality ("recognition model of phase two"). Thus, only real or non-synthetic sensor data and their labels are used for this second model. The second modality may, for example, be radar; in the recognition model of phase two, it may in turn be a deep neural network.

Advantages of the example method include that labeled training data may be generated quickly and at comparatively little cost, yet a high quality of the labels of this training sample may be achieved. It follows from that that a comparatively comprehensive training sample may be generated. It further follows from this that a recognition model, for example, a Deep Neural Network (DNN), generated with the aid of this labeled sample, may achieve a high degree of recognition accuracy and reliability.

An advantage that labeled training data may be quickly and cost-efficiently generated applies both to the first as well as to the second phase of the method. Since the labeled sensor data in the first phase are generated via a simulation, neither vehicles equipped with sensors and devices for recording the sensor data, nor human drivers, are required. Nor is a manual labeling by human processors necessary.

The quality of the sensor data in the first phase is based here on the selection of a sensor modality for which it is possible to define a generation model, which simulates as a good approximation the physical properties of this sensor modality. This results in a good quality of the synthetic sensor data provided the synthetic data largely coincide with real data when using a real, physical sensor of this modality. The quality of the labels is equally high, since in a simulation, the actual attributes of the simulated static and dynamic objects are immediately available. In addition, in case the modality one is necessary or helpful for the training of the recognition model, the associations of the sensor data with the objects or with their attributes may also be used, since these may also be provided by the simulation.

In the second phase as well, advantages of the method are that a labeled sample of the second sensor modality may be comparatively quickly and cost-efficiently generated. In the second phase, it is necessary in fact to equip one or multiple vehicles or robots with sensors of both modalities and with a device for recording these sensor data, but in the second phase as well, a complex manual labeling of these recorded data is not necessary. This is due to the fact that the recognition model, i.e., the result of the first phase, may be applied to the sensor data of the first modality in order to generate labels. These labels are then transferred to the second modality.

One further advantage of the two-step example method is that the selection of the sensor modality of the second phase is not restricted if a generation model functioning as a good approximation is to be implementable. This is necessary only for the modality of the first phase. This represents a significant advantage since, for the practical use in series production vehicles, modalities are usually preferred for which exact generation models are not implementable or implementable only with great effort. For example, the use of LIDAR lends itself for the first phase, since LIDAR point clouds may be calculated relatively simply synthetically from simulated vehicle surroundings, because the laser beams of a LIDAR are reflected at the surface of objects. In contrast, comparatively complex physical effects and the nature of the objects, including their material properties, would have to be considered when simulating a radar sensor because, in the case of radar waves, no simple reflection takes place at the surface. This does not represent a problem however, when using the method for radar in the second phase, because no simulation is necessary in the second phase, rather the labeled sample is obtained from (in this example) radar data relating to the recognition of the parallel recorded LIDAR data. On the other hand, radar has the advantage for the use in series production vehicles compared to LIDAR that radar sensors already tested and established in practice are available at comparatively favorable costs.

One advantage of the example method is also that the second phase may be extended to include additional sensor modalities. This may represent a significant advantage, because the automatically generated labels may also be transferred to further sensor modalities in an overlapping of the field of view with the field of view of the modality of the first phase, so that manual labeling is again unnecessary. A multimodal sensor set is desirable for applications of autonomous or semi-autonomous driving, since the redundancy thus achieved enhances the robustness and reliability of the system, in particular, if the conditions for one of the modalities are poor and this may be offset by another modality.

The sequence of the example method with the above-addressed two phases is shown in FIG. 2. In phase one, the synthetic, labeled sample of sensor data of the modality one is generated by simulation using the simulation tool, including the generation model. Phase two may be carried out after the training of the recognition model of the first modality.

Unlabeled samples of sensor data of the modalities one and two are recorded by a device for receiving an unlabeled sample of multimodal sensor data, for example, a vehicle, which is equipped with sensors and a device for receiving and storing the sensor data. An automatic label generation takes place via the recognition model for the modality one with the aid of the recognition model for the modality one and a labeled sample of sensor data of both modalities is generated.

Training the recognition model for the modality two enables the recognition model of the second modality to also recognize objects.

In the first phase, a synthetic, labeled sample of sensor data of the first modality is generated. This takes place with the aid of a simulation tool, which simulates both the movement of the ego vehicle as well as the movement of other vehicles in the surroundings of the ego vehicle. In addition, the static surroundings are also simulated, so that at any point in time the static and dynamic surroundings of the ego vehicle are generated, the object attributes being able to be suitably selected and thus the relevant labels of the objects being able to be derived. The synthetic sensor data of these objects are generated by a generation model, which represents a part of the simulation tool.

The generation model is based on the exact mathematical and algorithmic description of the physical properties of the first sensor modality, implementing a software module on this basis, which generates mathematically the sensor measured data to be expected, based on the attributes of the simulated objects, the properties of the respective implementation of the physical sensor, and on the position of the virtual sensor in the simulation.

When implementing the generation model, it is possible to differentiate between sub-models or corresponding software components.

Here, the simulated sensor described is a LIDAR. First, the sensor model describes and calculates the emission of the sensor waves, taking sensor properties into account. The sensor properties in this case are modality-specific and also dependent on the respective design and variant of the sensor.

Secondly, the sensor model describes and calculates the reception of the sensor waves reflected by the objects.

Sensor waves described here is laser light. The sensor wave propagation model calculates the propagation of the sensor wave (for example, scattering, attenuation) after being emitted by the sensor and until it strikes the relevant objects and, similarly, the propagation of the sensor waves reflected by the objects until they are detected by the sensor.

A simulated dynamic object may, for example, be a vehicle or a pedestrian. A simulated static object may, for example, be an obstacle, a guardrail or a traffic sign. The object model calculates the behavior of the sensor waves and their reflection when striking the objects, for example, via ray tracing of laser light in the case of LIDAR as a function of object attributes such as, for example, surface properties.

On the one hand, the sensor model is a function of the modality used (for example, LIDAR). On the other hand, however, the sensor model is, in particular, specific to the respective design and, if necessary, to the respective hardware and software version or configuration of the sensor actually used in phase two. For example, a LIDAR sensor model simulates the laser beams radiated by the respective implementation of the LIDAR sensor, taking the specific properties of the physical LIDAR sensor used in phase two of the method into account. These properties include, for example, the number of the layers of the LIDAR, i.e., the vertical resolution, the resolution in the horizontal direction, the velocity of the rotation if it involves a rotating LIDAR, or the frequency, as well as the horizontal and vertical beam angle or the field of vision. The sensor model also simulates the detection of the sensor waves reflected back by the objects, which ultimately result in the sensor measurements.

The sensor wave propagation model is also part of the generation model. It describes and calculates the change of the sensor waves, on the one hand, on the path from the sensor to a relevant object and, on the other hand, from the object back to the detection unit of the sensor. In this case, physical effects such as, for example, attenuation as a function of the path traveled or scattering as a function of surroundings properties are taken into account.

Finally, the generation model is also made up of at least one object model, whose task it is to calculate the changed sensor waves from the sensor waves reaching a respective relevant object, which arise as a result of a portion of the waves emitted by the sensor being reflected by the object. The object model takes attributes of the object into account, which influence this reflection of the sensor waves. In the example of the LIDAR, surface properties such as the color are relevant, or also the shape of the object, which determines the incident angle of the laser.

The description of these components applies to sensor modalities, which are based on the active emission of sensor waves by the sensor such as, for example, LIDAR, radar or ultrasonic sensors. In the case of passive sensor modalities (such as, for example, a camera), the generation model may also be divided into the described components, although the calculations then differ in part. For example, the generation of waves in the case of the sensor model is omitted and is instead replaced by a model for generating surroundings waves.

The recognition model of phase one may, for example, be a Deep Neural Network (DNN) for recognizing LIDAR point clouds. The attributes of the dynamic objects to be recognized are typically the position as a function of time, which may also be regarded as the object trajectory. Attributes are typically also recognized, which describe the size of the objects, a particular form of the objects ("bounding box") often being assumed as a simplifying approximation.

One possibility for the specific implementation of the recognition of the data of the first modality is to use a "single-frame"-based DNN for detecting the objects, here, i.e., not to initially accumulate the information of the sensor data over a particular time period, but in each case to provide the DNN only the data of a single frame (for example, a LIDAR sweep) as input. The objects thus detected may then be associated with objects (if present) already detected previously and the temporal course of the trajectories may be determined, for example, with the aid of Kalman filtering, using established methods of object tracking.

Alternatively, the tracking may also be carried out with the aid of learned methods. For example, a single-frame DNN may be linked to a Recurrent Neural Network (RNN) in such a way that information from the past from the Deep Neural Network may also be included for determining the object states at a particular point in time.

In the second phase, multimodal, real sensor data are recorded. The labels for these data are generated by the recognition model of the first modality, which has been trained in the first phase with the aid of the synthetic, labeled sample. Although this recognition is carried out for the data of the first modality, a transfer or application of the label to the data of the second modality is possible if the field of view of the second modality represents a subset of the field of view of the first modality.

A temporal interpolation of the labels may be necessary in this transfer if the frequency of the sensor measurements of the different modalities does not match or a synchronization of the sensors during reception does not take place.

A typical application for the labeled sample generated in phase two is the training of a recognition model, for example, of a Deep Neural Network, which receives the sensor data of the second modality as input and recognizes the static and dynamic objects in such a way that an estimation of the relevant object attributes is output. Similar to the above-described recognition model of phase one, it may be that a "Single-Frame" DNN and a Kalman tracking may be separately carried out. Similarly also to the recognition model of phase one, the total recognition, including the tracking, may alternatively be carried out using a trained method.

One further application for the labeled sample is the evaluation of the recognition accuracy of a software module for the surroundings perception based on the sensor data of modality two, for example, if this module uses no methods trained on a sample. If the module to be evaluated emanates from a training using the labeled sample generated with the method provided herein, an evaluation is nevertheless meaningful if it is able to be shown that the labels generated using the recognition model from phase one are qualitatively better with respect to relevant metrics than the result of the recognition model from phase two. In this case, the sensor of the first modality and the recognition model from phase one may be considered to be a reference system.

In summary, an example method for generating synthetic labeled data in a first phase and an example application of the resulting recognition model in a second phase are presented. The example method may be carried out on a device, which initially generates a labeled sample of synthetic data and subsequently generates a recognition model for a first modality with the aid of training. With this device or a device separate therefrom, it is subsequently possible to record real data and to label the sensor data of the second modality with the aid of the recognition model for the modality one.

Finally, it is noted that terms such as "having," "including," etc. exclude no other elements or steps and terms such as "one" do not exclude a plurality.

What is claimed is:

1. A method for generating training data for a recognition model for recognizing objects in sensor data of a sensor of an at least semi-autonomous vehicle, the method comprising:

recognizing objects and object attributes in auxiliary sensor data of an auxiliary sensor, of the at least semi-autonomous vehicle, which maps an overlapping area using a trained auxiliary recognition model; and transferring the object attributes of the objects recognized in the overlapping area to the sensor data which maps at least the overlapping area to generate the training data;

wherein the sensor detects and maps in the sensor data a detection area ahead of the at least semi-autonomous vehicle and in the auxiliary sensor data an auxiliary detection area, wherein the detection area and the auxiliary detection area overlap in the overlapping area, wherein the auxiliary recognition model includes an algorithm that has been trained via a training to recognize the objects in the auxiliary sensor data, wherein the training is performed using labeled samples, wherein areas including the recognized objects are marked in the labeled samples and the object attributes of the objects are stored, and wherein the auxiliary recognition model has learned to recognize the objects based on the labeled samples, wherein the auxiliary recognition model is trained using simulation training data before recognizing the object attributes, and wherein the simulation training data are generated using a generation model, the generation model including a sensor model of the auxiliary sensor, a propagation model, and an object model of at least one virtual object, and wherein the sensor model is used to simulate a wave emission of the auxiliary sensor and simulate a detection of a transmitted reflection by the auxiliary sensor, wherein a transmission of the wave emission through virtual surroundings including air particles and aerosols is simulated using the propagation model, and wherein a detected reflection is assigned at least one object attribute of the virtual object provided by the object model to generate the simulation training data.

2. The method as recited in claim 1, wherein the objects and the object attributes are synchronized with the sensor data.

3. The method as recited in claim 2, wherein to synchronize, a sensor movement of the sensor between an auxiliary detection point in time of an object by the auxiliary sensor and a detection point in time of the object by the sensor is compensated for using a piece of sensor movement information.

4. The method as recited in claim 2, wherein to synchronize, an object movement of an object between an auxiliary detection point in time of the object by the auxiliary sensor and a detection point in time of the object by the sensor is compensated for using an object movement attribute.

5. The method as recited in claim 1, wherein the sensor data and the auxiliary sensor data are detected by a shared sensor platform.

6. The method as recited in claim 1, wherein the sensor data are read in from a sensor of a first modality and the auxiliary sensor data are read in from an auxiliary sensor of a second modality different from the first modality.

7. The method as recited in claim 1, wherein the transmission of the wave emission through the virtual surroundings to the object is simulated as incoming waves using the propagation model, a reflection of the transmitted wave emission at the at least one virtual object is simulated using the object model, the transmission of the reflection through the virtual surroundings to the auxiliary sensor being simulated as incoming waves.

8. The method as recited in claim 1, wherein the sensor data and/or the auxiliary sensor data are detected using a camera, and/or a radar sensor, and/or a LIDAR sensor, and/or an ultrasonic sensor.

9. The method as recited in claim 1, wherein to transfer the object attributes, data points of the sensor data are assigned the object attributes of auxiliary data points of the auxiliary sensor data within a location tolerance, wherein each of the data points is a pixel and include an image coordinate value and an intensity value, and/or each of the data points is a point in space and include a direction value and a distance value.

10. A method for training a recognition model, the method comprising:

generating training data for a recognition model for recognizing objects in sensor data of a sensor, generating including:

recognizing objects and object attributes in auxiliary sensor data of an auxiliary sensor, of the at least semi-autonomous vehicle, which maps an overlapping area using a trained auxiliary recognition model, and transferring the object attributes of the objects recognized in the overlapping area to the sensor data which maps at least the overlapping area to generate the training data; and training the recognition model using generated training data;

wherein the sensor detects and maps in the sensor data a detection area ahead of the at least semi-autonomous vehicle and in the auxiliary sensor data an auxiliary detection area, wherein the detection area and the auxiliary detection area overlap in the overlapping area, wherein the auxiliary recognition model includes an algorithm that has been trained via a training to recognize the objects in the auxiliary sensor data, wherein the training is performed using labeled samples, wherein areas including the recognized objects are marked in the labeled samples and the object attributes of the objects are stored, and wherein the auxiliary recognition model has learned to recognize the objects based on the labeled samples, wherein the auxiliary recognition model is trained using simulation training data before recognizing the object attributes, and wherein the simulation training data are generated using a generation model, the generation model including a sensor model of the auxiliary sensor, a propagation model, and an object model of at least one virtual object, and wherein the sensor model is used to simulate a wave emission of the auxiliary sensor and simulate a detection of a transmitted reflection by the auxiliary sensor, wherein a transmission of the wave emission through virtual surroundings including air particles and aerosols is simulated using the propagation model, and wherein a detected reflection is assigned at least one object attribute of the virtual object provided by the object model to generate the simulation training data.

11. A method for activating an autonomous robot, which includes an at least semi-automated vehicle, the method comprising:
   activating the robot using an output of a recognition model, the recognition model being trained by:
      generating training data for a recognition model for recognizing objects in sensor data of a sensor, generating including:
         recognizing objects and object attributes in auxiliary sensor data of an auxiliary sensor, of the at least semi-autonomous vehicle, which maps an overlapping area using a trained auxiliary recognition model, and
         transferring the object attributes of the objects recognized in the overlapping area to the sensor data which maps at least the overlapping area to generate the training data; and
         training the recognition model using generated training data;
      wherein the sensor detects and maps in the sensor data a detection area ahead of the at least semi-autonomous vehicle and in the auxiliary sensor data an auxiliary detection area, wherein the detection area and the auxiliary detection area overlap in the overlapping area,
      wherein the auxiliary recognition model includes an algorithm that has been trained via a training to recognize the objects in the auxiliary sensor data, wherein the training is performed using labeled samples, wherein areas including the recognized objects are marked in the labeled samples and the object attributes of the objects are stored, and wherein the auxiliary recognition model has learned to recognize the objects based on the labeled samples,
      wherein the auxiliary recognition model is trained using simulation training data before recognizing the object attributes, and
      wherein the simulation training data are generated using a generation model, the generation model including a sensor model of the auxiliary sensor, a propagation model, and an object model of at least one virtual object, and wherein the sensor model is used to simulate a wave emission of the auxiliary sensor and simulate a detection of a transmitted reflection by the auxiliary sensor, wherein a transmission of the wave emission through virtual surroundings including air particles and aerosols is simulated using the propagation model, and wherein a detected reflection is assigned at least one object attribute of the virtual object provided by the object model to generate the simulation training data.

12. An apparatus to generate training data for a recognition model for recognizing objects in sensor data of a sensor of an at least semi-autonomous vehicle, comprising:
   a non-transitory machine-readable memory medium, on which is stored a computer program, which is executable by a processor, comprising:
      a program code arrangement having program code for generating training data for a recognition model for recognizing objects in sensor data of a sensor, by performing the following:
         recognizing objects and object attributes in auxiliary sensor data of an auxiliary sensor, of the at least semi-autonomous vehicle, which maps an overlapping area using a trained auxiliary recognition model; and
         transferring the object attributes of the objects recognized in the overlapping area to the sensor data which maps at least the overlapping area to generate the training data;
      wherein the sensor detects and maps in the sensor data a detection area ahead of the at least semi-autonomous vehicle and in the auxiliary sensor data an auxiliary detection area, wherein the detection area and the auxiliary detection area overlap in the overlapping area,
      wherein the auxiliary recognition model includes an algorithm that has been trained via a training to recognize the objects in the auxiliary sensor data, wherein the training is performed using labeled samples, wherein areas including the recognized objects are marked in the labeled samples and the object attributes of the objects are stored, and wherein the auxiliary recognition model has learned to recognize the objects based on the labeled samples,
      wherein the auxiliary recognition model is trained using simulation training data before recognizing the object attributes, and
      wherein the simulation training data are generated using a generation model, the generation model including a sensor model of the auxiliary sensor, a propagation model, and an object model of at least one virtual object, and wherein the sensor model is used to simulate a wave emission of the auxiliary sensor and simulate a detection of a transmitted reflection by the auxiliary sensor, wherein a transmission of the wave emission through virtual surroundings including air particles and aerosols is simulated using the propagation model, and wherein a detected reflection is assigned at least one object attribute of the virtual object provided by the object model to generate the simulation training data.

13. A non-transitory machine-readable memory medium, on which is stored a computer program, which is executable by a processor, comprising:
   a program code arrangement having program code for generating training data for a recognition model for recognizing objects in sensor data of a sensor of an at least semi-autonomous vehicle, by performing the following:
      recognizing objects and object attributes in auxiliary sensor data of an auxiliary sensor, of the at least semi-autonomous vehicle, which maps an overlapping area using a trained auxiliary recognition model; and
      transferring the object attributes of the objects recognized in the overlapping area to the sensor data which maps at least the overlapping area to generate the training data;
   wherein the sensor detects and maps in the sensor data a detection area ahead of the at least semi-autonomous vehicle and in the auxiliary sensor data an auxiliary detection area, wherein the detection area and the auxiliary detection area overlap in the overlapping area, wherein the auxiliary recognition model includes an algorithm that has been trained via a training to recognize the objects in the auxiliary sensor data, wherein the training is performed using labeled samples, wherein areas including the recognized objects are marked in the labeled samples and the object attributes of the objects are stored, and wherein the auxiliary recognition model has learned to recognize the objects based on the labeled samples, wherein the auxiliary recognition model is trained using simulation training data before recognizing the object attributes, and wherein the simulation training data are generated using a generation model, the generation model including a sensor model of the auxiliary sensor, a propagation model, and an object model of at least one virtual object, and wherein the sensor model is used to simulate a wave emission of the auxiliary sensor and simulate a detection of a transmitted reflection by the auxiliary sensor, wherein a transmission of the wave emission through virtual surroundings including air particles and aerosols is simulated using the propagation model, and wherein a detected reflection is assigned at least one object attribute of the virtual object provided by the object model to generate the simulation training data.

* * * * *